United States Patent [19]

Albagnac

[11] Patent Number: 4,569,210
[45] Date of Patent: Feb. 11, 1986

[54] COOLING CONTROLLER UTILIZING THE JOULE-THOMSON EFFECT

[75] Inventor: Rene D. M. Albagnac, Paris, France

[73] Assignee: Societe Anonyme de Telecommunications, Paris, France

[21] Appl. No.: 758,058

[22] Filed: Jul. 23, 1985

[30] Foreign Application Priority Data

Jul. 30, 1984 [FR] France ................. 84 12096

[51] Int. Cl.⁴ .................................. F25B 19/00
[52] U.S. Cl. .......................... 62/514 JT; 62/222
[58] Field of Search .............. 62/514 JT, 222, 223

[56] References Cited

U.S. PATENT DOCUMENTS

| 1,719,075 | 7/1929 | Muffly et al. | 62/8 |
| 2,312,671 | 3/1943 | Otto | 297/12 |
| 2,398,262 | 4/1946 | Swart | 62/8 |
| 3,273,356 | 9/1966 | Hoffman | 62/514 JT |
| 3,320,755 | 5/1967 | Jepsen et al. | 36/45 |
| 3,375,975 | 4/1968 | Smith et al. | 236/87 |
| 3,517,525 | 6/1970 | Campbell | 62/514 JT |
| 3,613,689 | 10/1971 | Crump et al. | 128/303.1 |
| 3,827,252 | 8/1974 | Chovet et al. | 62/514 JT |
| 4,002,039 | 1/1977 | Cramer et al. | 62/514 JT |
| 4,177,650 | 12/1979 | Campbell | 62/514 JT |
| 4,468,935 | 9/1984 | Abagnac | 62/514 JT |

FOREIGN PATENT DOCUMENTS

| 0005048 | 10/1979 | European Pat. Off. |
| 0069346 | 1/1983 | European Pat. Off. |
| 1550281 | 11/1968 | France |
| 1594598 | 7/1970 | France |
| 2265048 | 3/1972 | France |
| 2085139 | 4/1982 | United Kingdom |

Primary Examiner—Ronald C. Capossela
Attorney, Agent, or Firm—Owen, Wickersham & Erickson

[57] ABSTRACT

Controller for a cooling system utilizing the Joule-Thomson effect for a cryostat, wherein the expansible component consists of a metal rod (20) of very small diameter, inside and coaxial with the tubular envelope (7), one end (21) of this rod (20) is fixed mechanically, and is joined thermally by a transverse bulkhead (22), to the tubular envelope (7) at a point of the latter lying between the warm point and the cold point (10), the other end (23) of this rod is fixed to a fork (16) for operating the needle (13) surrounding the seat (11,12) of the needle and driving the needle (13) through the intermediary of an adjustment component (18), and lastly the said fork (16) incorporates a periphery, preferably cylindrical, which leaves a large annular gap between this periphery and the inside surface of the envelope tube (7).

13 Claims, 2 Drawing Figures

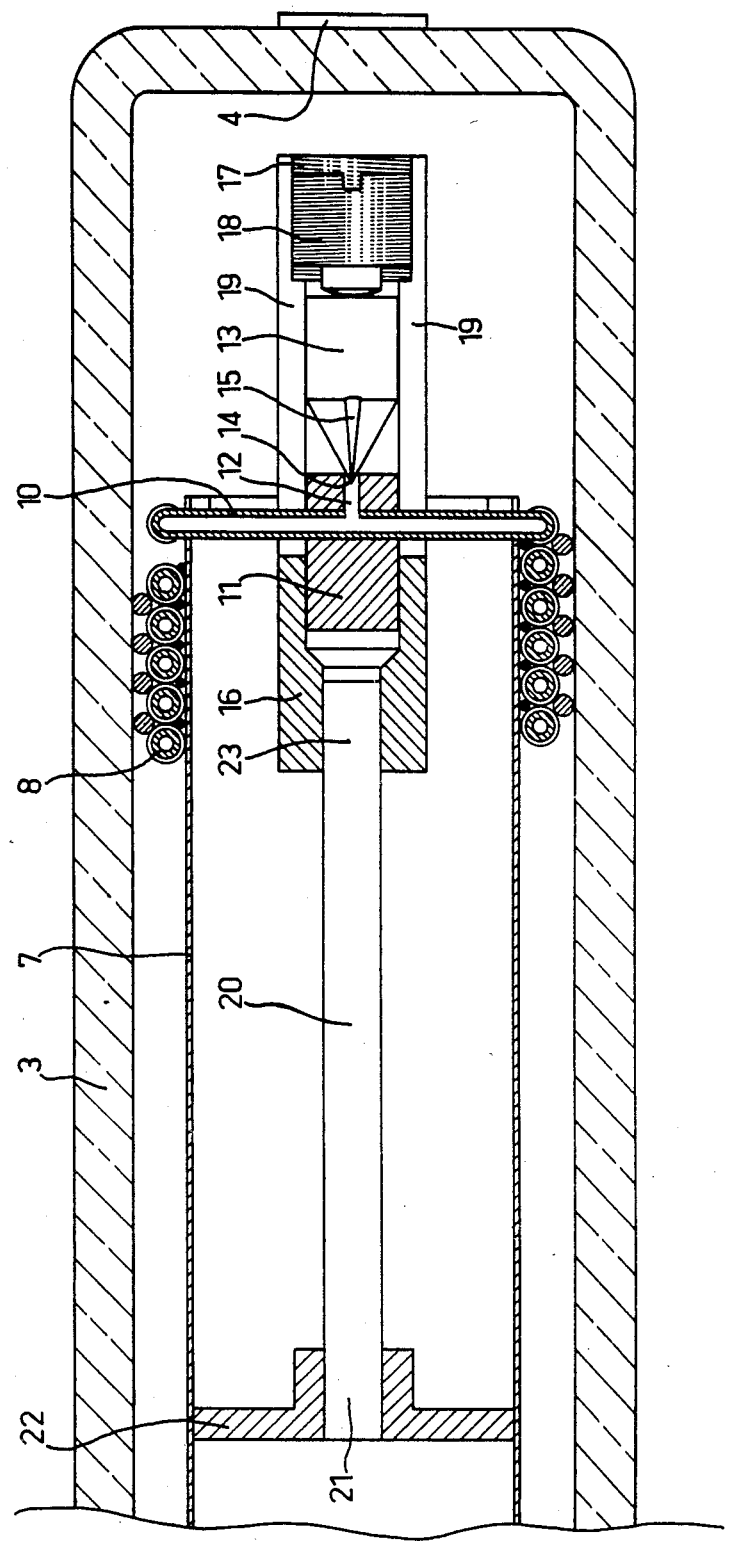

COOLING CONTROLLER UTILIZING THE JOULE-THOMSON EFFECT

The invention relates to cooling systems utilizing the Joule-Thomson effect which use the expansion of a gas at high pressure to produce very low temperatures.

Such cooling systems are particularly used for cooling to a very low temperature the infra-red detectors installed in missiles. In this particular case, the source of gas under pressure is generally a nitrogen reservoir at high pressure which is situated on board the missile and which allows the infra-red cell to be cooled to the temperature of liquefaction of nitrogen, which is 77° K., starting from gas at the ambient temperature. It will be understood that for such an application it is necessary to have an extremely accurate control so as to allow very rapid cooling and at the same time a minimum consumption of nitrogen once the desired tempeerature is reached. In fact, this consumption determines simultaneously the weight of the nitrogen reservoir installed and the duration of operation. In addition, it is necessary that this control should operate correctly for an ambient temperature varying between wide limits, as this ambient temperature establishes simultaneously the temperature of the gas under pressure entering the cryostat, and the ambient conditions surrounding this cryostat which constitute the factor determining heat losses, and therefore the refrigerating power required. Lastly, it goes without saying that the device should function correctly with a gas pressure in the reservoir which will decrease gradually quite naturally as the gas is consumed.

Basically, such controllers necessarily incorporate an expansible component which actuates the closure of a needle when the temperature drops. Among the regulators of this type, some are known which utilize a relatively elastic expansible component, such as a metal bellows filled with an expansible gas, or a bimetallic strip working by bending. Such devices are not suitable for the application envisaged owing to the fact that, as a result of the high elasticity of the expansible component, the control is strongly influenced by the gas pressure existing under the needle. For this reason, only those control devices utilizing the longitudinal expansion of a metal can offer relative independence from the gas pressure.

Among the devices of the latter type there are known particularly those described in French Pat. Nos. 2,322,336 and 2,377,588. All the said devices incorporate a metal component which is longitudinally expansible, and which consists of a metal tube of fairly large diameter relative to the inside diameter of the body of the exchanger, this expansible component being fixed mechanically and being in thermal exchange contact with the cold point, that is to say the seat of the needle. The result of this arrangement is that these controllers from the prior art always operate as on/off controllers and consequently the control incorporates hunting. In other words, each time a low temperature has contracted the expansible component to the point where the needle closes, the flow is interrupted until the temperature of the cold point and of the expansible component has again risen sufficiently. These devices are therefore not sufficiently accurate because the temperature varies according to a saw-tooth curve, and if the peaks of the curve correspond to the maximum temperature requirements, the low points of the curve lead to losses incurred needlessly and therefore to an unnecessarily high gas consumption.

The desirability is also known, particularly according to European Pat. No. 84,308 in the name of the applicant company, of arranging the closing component so that it always leaves a small minimum flow which is determined so that one stage of lique faction is always obtained upstream of the restrictor in order to provide a self-regulating phenomenon simply by making use of the difference in pressure drop between the flow of liquefied gas and the corresponding flow of the gas from which it is derived. However, even a controller utilizing the longitudinal expansion of a metal, having been modified so as to incorporate such a minimum flow, would still operate if not on the on/off principle, then at least on the on and almost off principle and would still necessarily produce hunting. In fact, the secondary control phenomenon described above can only operate within narrow limits of temperatures in the region of the bottom of the necessary range, otherwise the expansible component would become superfluous.

In addition, with these control devices from the prior art, when cooling is initially brought into operation, the needle generally becomes completely or partially closed owing to the sudden cooling of the cold point which is, as mentioned above, the seat for the needle, before the component which is to be cooled has reached the desired low temperature. In other words, the hunting occurs to an even greater extent when cooling is commenced and increases the duration of the latter which, as is mentioned above, is a major disadvantage for the application envisaged.

The aim of the invention is to eliminate the preceding disadvantages by constructing a cooling controller with a longitudinally expansible metal component which provides at the same time rapid cooling and accurate control without hunting.

The invention incorporates as the expansible component a metal rod of small diameter, coaxial with the tubular envelope of the exchanger, and one end of this rod is joined mechanically and thermally to a transverse bulkhead which is fixed in the tubular body in an intermediate position between the warm point, consisting of the gas inlet, and the cold point, consisting of the seat of the needle, and the other end of this rod is joined to a fork which actuates the needle and which surrounds the seat of the needle, this fork leaving a large annular gap between its periphery and the inside of the tubular body so as to avoid thermal exchanges in this region.

Preferably, the annular space between the tubular body and the expansible rod together with the periphery of the fork is covered with a heat insulator, such as cotton, so as to avoid longitudinal and transverse convection movements. The needle is adjustable by an adjustment screw which is screwed into the fork without being fixed to the needle, and its point preferably incorporates a slight flat, several microns in depth, which is determined so as to provide secondary control for low values of the ambient temperature.

Other features of the invention will emerge from the following description of an embodiment of the controller given by way of example and shown in the accompanying drawing, in which:

FIG. 2 shows a partial axial section on an even larger scale along a section plane which is perpendicular to that of FIG. 1.

Figure 1:
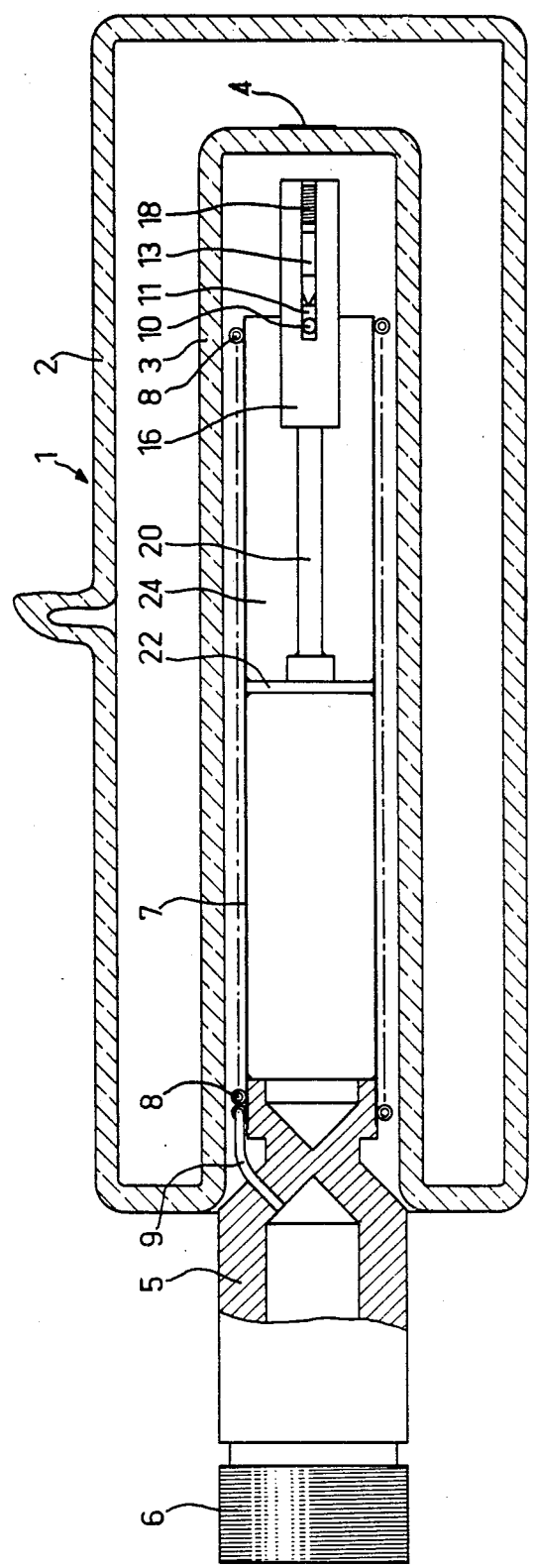
FIG. 1 is an axial section drawn to a large scale of the cryostat assembly.

As shown in FIG. 1, the cryostat 1 consists of a Dewar flask formed on an outer envelope 2 and an inner envelope 3 separated by a vacuum, the inner envelope 3 incorporating internally at its bottom the component which is to be cooled 4 consisting, for example, of an infra-red detector cell which is activated by rays passing through the bottom walls of the cryostat 1.

In order to cool this cell 4, a cooling system utilizing the Joule-Thomson effect is used in a known manner, which incorporates a connector 5 connected by its threaded end 6 to a supply of nitrogen under pressure, generally coming from a reservoir under pressure. A tubular envelope 7 is fixed to this connector 5, and around the tubular envelope 7 is wound, according to a known technique, an exchanger tube 8 of very small diameter with turns for separation, baffle and setting purposes wound around this tube and around the tubular envelope 7, respectively, these various components which are quite conventional being shown in FIG. 2 but not referenced. One end 9 of the tube 8 is of course joined in a sealed manner to the connector 5 on the same side as the supply of gas at ambient temperature, and its other end 10 crosses the tubular envelope 7 along a diameter, the tube terminating in a plugged end. A very small cylindrical body 11 is fixed to this straight diametral portion 10, the cylindrical body 11 having a diametral hole for the portion 10 to pass through and an axial hole 12 which also passes through the portion 10 of the tube and which serves as a seat for the needle. At least the two ends of the tube 10 are of course soldered to the tubular envelope 7 and the component 11 is itself soldered to the center of this portion 10 and is counterbored in the extension of the hole 12.

It is through this hole 12 that the gas expands on leaving the coil 8, and in expanding cools the tubular exchanger by counter-flow in the usual manner before escaping to the atmosphere.

To modify the flow of this gas, a needle 13 is used in a known manner whose point 14 enters the hole 12. In the example shown, this needle 13 simply consists of a component in the shape of a cylindrical cone, preferably with a flat 15, however, or a hollow arranged along a generating line of the cone and having a depth of penetration of about 7 microns.

In order to operate this needle, a fork 16 is used consisting of a cylindrical component incorporating an axial bore which fits with the required clearance the cylindrical periphery of the seat 11 and also the needle 13, while a threaded end 17 houses an adjustment screw 18 acting by simple contact upon this needle 13 without being fixed to it. The cylindrical wall of the fork 16 also incorporates two diametral slots 19 of sufficient width to allow the straight portion 10 of the tube 8 to pass through freely.

Lastly, to operate this fork, and by its intermediary the needle 13, a cylindrical rod 20 is utilized as an expansible component, made of brass, for example, so as to facilitate brazing or soldering, whereas all the other metal components described previously are made of the alloy Invar, particularly 5, 7, 11, 13, 16 and 18.

As shown in the figures, one end 21 of this rod is mechanically fixed and thermally connected by brazing or soldering and through the intermediary of a bulkhead 22, preferably also made of Invar, to the inside wall of the tubular envelope 7 at a point of the latter which, as is apparent from FIG. 1, lies between the warm end 9 and the cold end 10 of the exchanger tube 8. The other end 23 of this rod 20 is also fixed by brazing or soldering to the head of the cylindrical fork 16. As shown in FIG. 2, the cylindrical rod 20 and the cylindrical fork 16, which are coaxial to the tubular envelope 7, both have a diameter which is sufficiently small so as to leave a large annular gap between the cylindrical periphery and the inside cylindrical periphery of the tube 7. This is to avoid any direct thermal exchange by conduction or by convection between these surfaces. In addition, according to the invention a heat insulator 24, consisting for example of natural cotton, is preferably arranged so as to fill this gap and to eliminate all convection movements, both longitudinal and transverse, between the cold point 11 and the remainder of the exchanger.

Owing to this arrangement, according to the invention more rapid initial cooling is obtained, together with accurate control without hunting, even for ambient temperatures varying between $-40°$ C. to $+80°$ C.

In fact, when the device is put into service, all the components together with the gas are at the ambient temperature, and when the supply of gas is turned on, by means of a conventional device which is not shown, cooling is obtained by the nitrogen leaving the seat 12 which is wide open and expanding through the slots 19, this nitrogen which is gaseous and cold cooling simultaneously the component 4, the interior of the cryostat and progressively the various turns of the tubular exchanger, beginning with the last turns. By the usual process, liquefaction of this nitrogen is thus progressively obtained and a rapid lowering of the temperature of the whole zone surrounding the cell 4 down to $77°$ K. occurs. During the whole of this stage of operation at full power, the control does not intervene owing to the fact that cooling has not yet reached the region occupied by the bulkhead 22. In fact, the gas continues to be supplied through 9 at the ambient temperature and as a result in practice it brings calories to the bulkhead 22, and thus to the end 21 of the rod 20, while its other end 23 is cooled only by the thermal bridge consisting of the fork 16. Therefore in contrast to the conventional device, it is only after a considerrable delay that the control comes into operation, that is to say when the temperature of liquefaction has progressed broadly along the length of the envelope tube 7 along the outside of the latter. This starting phase at full power allows the device constructed in accordance with this technique to provide cooling from the ambient temperature down to the temperature of liquefaction in a time as short as 2 to 3 seconds.

Once the control comes into operation by progressive closure of the needle in order to introduce a restriction which is no longer negligible, the control takes place in an accurate and steady manner, once again owing to the arrangement mentioned. In fact, the thermal bridging consisting of the bulkhead 22 reacts as a function of the progression of the temperature of liquefaction along the turns 8 starting from the cold point 12, but also introducing a term which is proportional to the ambient temperature, in the form of the supply of gas at 9 at this ambient temperature. Indeed, it is known that it is this same ambient temperature which determines the temperature gradient through the walls of the cryostat 1, and hence the losses and consequently the refrigeration power required.

By way of a practical example, it is possible to adjust the needle 13 owing to the screw 18 in such a way that this needle is closed for an ambient temperature of $20°$ C. and once the device has commenced cooling. In this way, for ambient temperatures between $20°$ C. and −40° C., this needle remains closed, and the control utilizes in this case the secondary control phenomenon explained above, owing to the presence of the flat 15 and to the variation in length of the capillary tube 8 which are concerned with the liquid phase, which is sufficient to reduce the consumption of gas when the ambient temperature diminishes (high altitude for example). On the other hand, when the ambient temperature varies from +20° to +80° C., the control intervenes by expansion or by a very small contraction of the rod 20, owing to the thermal bridging mentioned and as a function of the progression of cooling at one end and of the supply at the ambient temperature at the other end, thus simultaneously taking into account the actual conditions of temperature and of foreseeable power.

Lastly, as an additional advantage, the invention allows the cryostat assembly to be miniaturized very considerably, with thus a corresponding reduction in consumption.

I claim:

1. A cooling controller utilizing the Joule-Thomson effect for a cryostat, incorporating a tubular envelope (7) around which an exchanger tube (8) is wound in which the gas under pressure is cooled by counter-flow and is partially liquefied before expanding at the other end through a hole (12), the said controller consisting of a needle (13) controlled by a longitudinally expansible metal component (20) in such a way as to close the said hole gradually with a fall in temperature, wherein the said expansible component consists of a rod (20) of small diameter, inside and coaxial with the tubular envelope (7), one end (21) of this rod (20) is fixed mechanically and is joined thermally by a transverse bulkhead (22) to the tubular envelope (7) at a point of the latter lying between the warm point (9) and the cold point (10) the other end (23) of this rod is fixed to a fork (16) for operating the needle (13) surrounding the seat (11, 12) of the needle and driving the needle (13) through the intermediary of an adjustment component (18), and lastly the said fork (16) incorporates a periphery, preferably cylindrical, entering at least partially into the tubular envelope (7) while leaving a large annular gap providing the function of insulation between this periphery and the inside surface of the envelope tube (7).

2. The controller as claimed in claim 1, wherein the annular gap existing between the tubular envelope (7) and the rod (20) together with the fork (16), and extending from the bulkhead (22) as far as the cold point (10) is covered with a heat insulator which opposes longitudinal and transverse convection movements.

3. The controller as claimed in claim 2 wherein the needle (13), in the shape of a cylindrical cone, incorporates on a generating line of its conical portion of flat or a hollow (15) of very small depth forming a minimum determined passage so as to ensure the intervention of secondary control of a known type for low values of the ambient temperature.

4. The controller as claimed in claim 3 wherein the needle (13) is mounted so as to slide freely by its cylindrical surface in an internal bore of the fork (16) which slides outside the seat (11), also cylindrical, and which is controlled by simple contact with an adjustment screw (18) to which it is not fixed.

5. The controller as claimed in claim 4 wherein the seat (11) of the needle is a cylindrical component which is fixed coaxially to the tubular envelope (7) only through the intermediary of a last straight portion (10) of the exchanger tube (8) crossing the tube along a diameter.

6. The controller as claimed in claim 3 wherein the seat (11) of the needle is a cylindrical component which is fixed coaxially to the tubular envelope (7) only through the intermediary of a last straight portion (10) of the exchanger tube (8) crossing the tube along a diameter.

7. The controller as claimed in claim 2 wherein the seat (11) of the needle is a cylindrical component which is fixed coaxially to the tubular envelope (7) only through the intermediary of a last straight portion (10) of the exchanger tube (8) crossing the tube along a diameter.

8. The controller as claimed in claim 1, wherein the needle (13), in the shape of a cylindrical cone, incorporates on a generating line of its conical portion a flat or a hollow (15) of very small depth forming a minimum determined passage so as to ensure the intervention of secondary control of a known type for low values of the ambient temperature.

9. The controller as claimed in claim 8 wherein the seat (11) of the needle is a cylindrical component which is fixed coaxially to the tubular envelope (7) only through the intermediary of a last straight portion (10) of the exchanger tube (8) crossing the tube along a diameter.

10. The controller as claimed in claim 8, wherein the needle (13) is mounted so as to slide freely by its cylindrical surface in an internal bore of the fork (16) which slides outside the seat (11), also cylindrical, and which is controlled by simple contact with an adjustment screw (18) to which it is not fixed.

11. The controller as claimed in claim 10 wherein the seat (11) of the needle is a cylindrical component which is fixed coaxially to the tubular envelope (7) only through the intermediary of a last straight portion (10) of the exchanger tube (8) crossing the tube along a diameter.

12. The controller as claimed in claim 1, wherein the seat (11) of the needle is a cylindrical component which is fixed coaxially to the tubular envelope (7) only through the intermediary of a last straight portion (10) of the exchanger tube (8) crossing the tube along a diameter.

13. The controller as claimed in claim 12 wherein the seat (11) of the needle is a cylindrical component which is fixed coaxially to the tubular envelope (7) only through the intermediary of a last straight portion (10) of the exchanger tube (8) crossing the tube along a diameter.

* * * * *